(12) United States Patent
Nogi (10) Patent No.: US 10,790,089 B2
(45) Date of Patent: Sep. 29, 2020

(54) STACKED CAPACITOR

(71) Applicant: KYOCERA Corporation, Kyoto-shi, Kyoto (JP)

(72) Inventor: Takafumi Nogi, Kirishima (JP)

(73) Assignee: Kyocera Corporation, Kyoto (JP)

( * ) Notice: Subject to any disclaimer, the term of this patent is extended or adjusted under 35 U.S.C. 154(b) by 120 days.

(21) Appl. No.: 16/301,459

(22) PCT Filed: May 26, 2017

(86) PCT No.: PCT/JP2017/019750
§ 371 (c)(1),
(2) Date: Nov. 14, 2018

(87) PCT Pub. No.: WO2017/204338
PCT Pub. Date: Nov. 30, 2017

(65) Prior Publication Data
US 2019/0287724 A1 Sep. 19, 2019

(30) Foreign Application Priority Data

May 27, 2016 (JP) .................................. 2016-106467

(51) Int. Cl.
| | |
|---|---|
| H01G 4/35 | (2006.01) |
| H01G 4/38 | (2006.01) |
| H01G 4/30 | (2006.01) |
| H01G 4/12 | (2006.01) |
| H01G 4/228 | (2006.01) |
| H01G 4/232 | (2006.01) |

(52) U.S. Cl.
CPC ................. *H01G 4/30* (2013.01); *H01G 4/12* (2013.01); *H01G 4/228* (2013.01); *H01G 4/232* (2013.01); *H01G 4/35* (2013.01)

(58) Field of Classification Search
None
See application file for complete search history.

(56) References Cited

U.S. PATENT DOCUMENTS 7,595,973 B1 * 9/2009 Lee .................. H01G 4/005
 361/303
7,630,208 B2 * 12/2009 Lee .................. H01G 4/012
 361/766

(Continued)

FOREIGN PATENT DOCUMENTS

JP 2009-060114 A 3/2009

*Primary Examiner* — Dion Ferguson
(74) *Attorney, Agent, or Firm* — Volpe and Koenig, P.C.

(57) ABSTRACT

A stacked capacitor includes a laminate; first to fourth external electrodes; a first capacitor portion, a second capacitor portion, and a third capacitor portion which are arrayed in the laminate from a first surface toward a second surface along a laminating direction. The first capacitor portion and the third capacitor portion each have a capacitance larger than that of the second capacitor portion. Inductor components of the first capacitor portion and the third capacitor portion are different in physical length from each other and are connected in parallel between the first external electrode disposed on a first end surface and the third external electrode disposed on a first side surface and between the first external electrode and the fourth external electrode disposed on a second side surface.

11 Claims, 9 Drawing Sheets

(56) References Cited

U.S. PATENT DOCUMENTS

| | | | | |
|---|---|---|---|---|
| 2007/0121275 A1* | 5/2007 | Takashima | ............... | H01G 4/30 |
| | | | | 361/311 |
| 2008/0080121 A1* | 4/2008 | Togashi | ................... | H01G 4/30 |
| | | | | 361/303 |
| 2008/0084651 A1* | 4/2008 | Oguni | .................... | H01G 4/012 |
| | | | | 361/303 |
| 2009/0244807 A1* | 10/2009 | Lee | ......................... | H01G 4/30 |
| | | | | 361/306.2 |
| 2012/0327557 A1* | 12/2012 | Ahn | ....................... | H01G 2/065 |
| | | | | 361/321.3 |
| 2014/0355177 A1* | 12/2014 | Lee | ......................... | H01G 4/30 |
| | | | | 361/321.2 |
| 2016/0104577 A1* | 4/2016 | Cho | ....................... | H01G 4/012 |
| | | | | 361/301.4 |

* cited by examiner

STACKED CAPACITOR

TECHNICAL FIELD

The present invention relates to a stacked capacitor for use in a noise filter or the like, which reduces an equivalent series inductance (ESL: Equivalent Series Inductance) in a high frequency region.

BACKGROUND ART

In recent years, information processing devices, communication devices, and so on are digitalized, and those devices have been advanced in higher frequency of a digital signal treated with acceleration of an information processing capability. Therefore, in those devices, similarly, generated noise tends to increase in the high frequency range, and for noise countermeasures, for example, an electronic component such as a stacked capacitor is used. The stacked capacitor of this type is disclosed in, for example, Patent Literature 1.

CITATION LIST

Patent Literature

Patent Literature 1: Japanese Unexamined Patent Publication JP-A 2009-60114

SUMMARY OF INVENTION

A stacked capacitor according to the present disclosure includes: a laminate having a rectangular parallelepiped shape, including a plurality of dielectric layers laminated on each other, the laminate including a first surface and a second surface which are opposed to each other, a first side surface and a second side surface which are opposed to each other, and a first end surface and a second end surface which are opposed to each other; a first external electrode disposed on the first end surface, a second external electrode disposed on the second end surface, a third external electrode disposed on the first side surface, and a fourth external electrode disposed on the second side surface; and a first capacitor portion, a second capacitor portion, and a third capacitor portion which are arrayed in the laminate from the first surface toward the second surface along a laminating direction. The first capacitor portion and the third capacitor portion are configured so that first internal electrodes each of which is exposed to the first end surface and electrically connected to the first external electrode and second internal electrodes each of which is exposed to the first side surface and the second side surface and electrically connected to the third external electrode and the fourth external electrode are alternately disposed to face each other through dielectric layers of the plurality of dielectric layers. The second capacitor portion is disposed between the first capacitor portion and the third capacitor portion, and the second capacitor portion is configured so that third internal electrodes each of which is exposed to the second end surface and electrically connected to the second external electrode and the second internal electrodes each of which is exposed to the first side surface and the second side surface and electrically connected to the third external electrode and the fourth external electrode are alternately disposed to face each other through dielectric layers of the plurality of dielectric layers. The first capacitor portion and the third capacitor portion each have a capacitance larger than that of the second capacitance portion. Inductor components of the first capacitor portion and the third capacitor portion are different in physical length from each other and are connected in parallel between the first external electrode and the third external electrode and between the first external electrode and the fourth external electrode.

BRIEF DESCRIPTION OF DRAWINGS

FIGS. 4A and 4B are cross-sectional views of the laminate in a direction orthogonal to a laminating direction in a first capacitor portion and a third capacitor portion of the stacked capacitor shown in FIG. 1, in which

FIGS. 5A and 5B are cross-sectional views of the laminate in the direction orthogonal to the laminating direction in a second capacitor portion of the stacked capacitor shown in FIG. 1, in which

DESCRIPTION OF EMBODIMENTS

For example, in a power supply circuit or the like of an LSI such as a CPU, a stacked capacitor is used for the purpose of preventing the penetration of noise into the LSI from a power supply line or another device or the malfunction or the like of the LSI caused by the noise.

However, the information processing device, the communication device, or the like is further increasing the trend of the higher frequency. In the stacked capacitor, for example, there is a need to further reduce an equivalent series inductance (ESL), for example, for the purpose of reducing the noise of the high frequency range of the signal line, the power supply line, or the like.

In the stacked capacitor according to the present disclosure, capacitor portions are disposed on both ends of the stacked capacitor with respect to one capacitor portion in a laminating direction of the laminate, and inductor components of the capacitor portions on both the ends are connected in parallel to each other. As a result, the equivalent series inductance (ESL) can be reduced. Hereinafter, the stacked capacitor according to the present disclosure will be described in detail.

EMBODIMENTS

Hereinafter, a stacked capacitor 10 according to an embodiment of the present disclosure will be described with reference to the accompanying drawings.

In the stacked capacitor 10, a Cartesian coordinate system XYZ is defined for convenience, a positive side in a Z direction is defined as upward, and terms of an upper surface and a lower surface are used. In each of the drawings, the same members and the same portions are indicated by common reference numerals or symbols, and a repetitive description will be omitted.

As shown in FIGS. 1 to 5B, the stacked capacitor 10 includes a laminate 1, external electrodes 2 (a first external electrode 2a, a second external electrode 2b, a third external electrode 2c, and a fourth external electrode 2d), internal electrodes 3 (first internal electrodes 3a, second internal electrodes 3b, and third internal electrodes 3c), and capacitor portions 4 (a first capacitor portion 4a, a second capacitor portion 4b, and a third capacitor portion 4c).

The first external electrode 2a is disposed on a first end surface 1c, and the second external electrode 2b is disposed on a second end surface 1d. The third external electrode 2c is disposed on a first side surface 1e, and the fourth external electrode 2d is disposed on a second side surface 1f. The first capacitor portion 4a, the second capacitor portion 4b, and the third capacitor portion 4c are formed in the laminate 1, and arrayed from a first surface 1a (upper surface) toward a second surface 1b (lower surface) along the laminating direction. In addition, the first capacitor portion 4a and the third capacitor portion 4c each have a capacitance larger than that of the second capacitor portion 4b.

The laminate 1 is formed in a rectangular parallelepiped in which a plurality of dielectric layers 1g are laminated on each other, which is a sintered body obtained by laminating and sintering a plurality of ceramic green sheets serving as the dielectric layers 1g. As described above, the laminate 1 is formed in the rectangular parallelepiped, a pair of surfaces of the laminate 1 are indicated by the first surface 1a and the second surface 1b which are opposed to each other, and a pair of end surfaces are indicated by the first end surface 1c and the second end surface 1d which are opposed to each other. In addition, a pair of side surfaces are indicated by the first side surface 1e and the second side surface 1f which are orthogonal to the first end surface 1c and the second end surface 1d and face each other. A plane of the laminate 1, which is a cross-section (XY plane) orthogonal to the laminating direction (Z direction) of the dielectric layers 1g, is formed in a rectangular shape as shown in FIGS. 4A to 5B.

The stacked capacitor 10 has a length in a longitudinal direction (X direction) of, for example, 0.6 (mm) to 2.2 (mm), a length in a lateral direction (Y direction) of, for example, 0.3 (mm) to 1.2 (mm), and a length in a height direction (Z direction) of, for example, 0.3 (mm) to 1.5 (mm).

In the stacked capacitor 10, the first capacitor portion 4a, the second capacitor portion 4b, and the third capacitor portion 4c are formed in the laminate 1 along the laminating direction, and, for example, a length of the stacked capacitor 10 in the height direction (Z direction) is larger than a length of the stacked capacitor 10 in the lateral direction (Y direction). For example, the stacked capacitor 10 is a so-called tall capacitor in which the length in the longitudinal direction (X direction) is 1.15 (mm), the length in the lateral direction (Y direction) is 0.65 (mm), and the length in the height direction (Z direction) is 0.8 (mm).

Each of the dielectric layers 1g is formed in a rectangular shape in a plan view from the laminating direction (Z direction), and a thickness of each dielectric layer 1g is, for example, 0.5 (μm) to 3 (μm). In the laminate 1, for example, 10 to 1000 dielectric layers 1g are laminated on each other in the Z direction.

The dielectric layers 1g are formed of, for example, barium titanate ($BaTiO_3$), calcium titanate ($CaTiO_3$), strontium titanate ($SrTiO_3$), calcium zirconate ($CaZrO_3$), or the like. In addition, the dielectric layers 1g may be particularly formed of barium titanate as a ferroelectric material high in dielectric constant from the viewpoint of a high dielectric constant.

Figure 1:
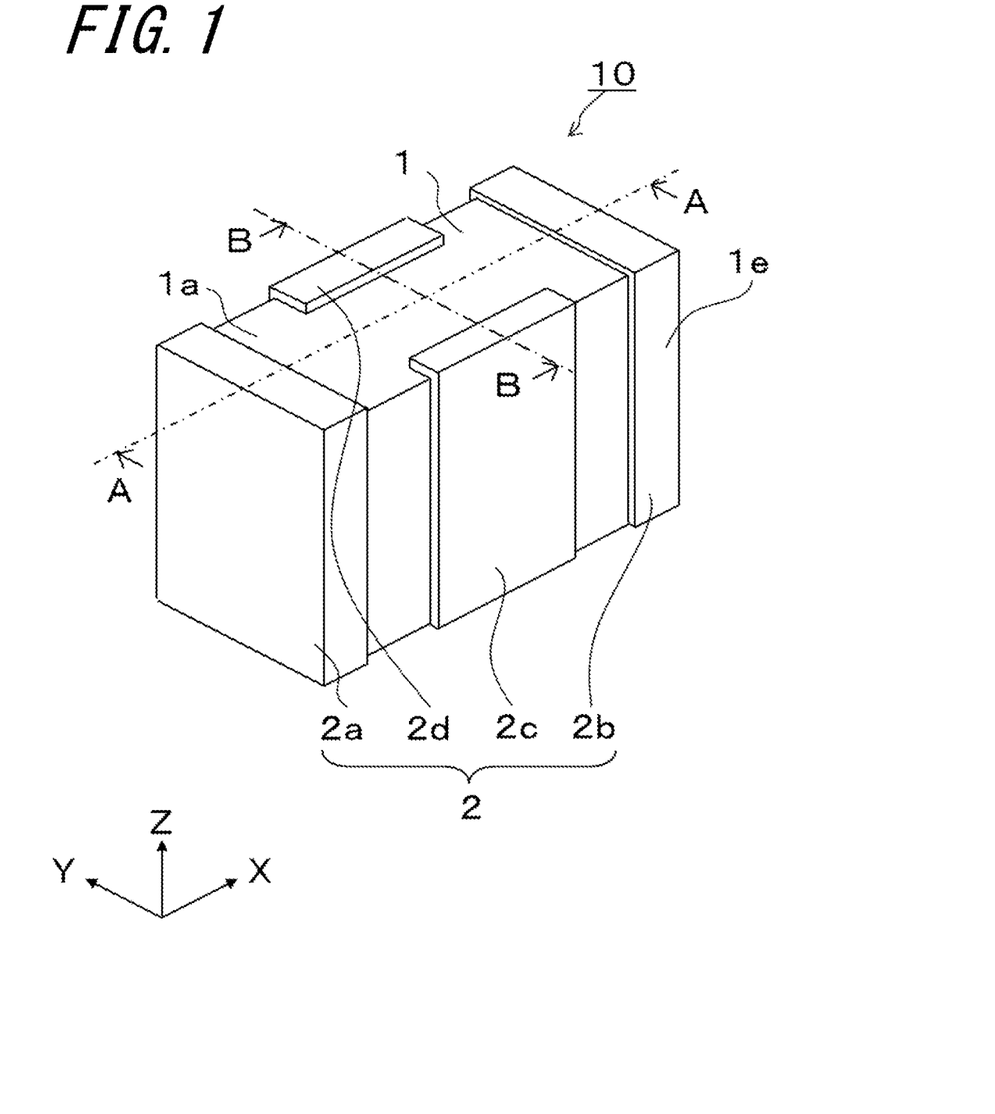
FIG. 1 is a schematic perspective view showing a stacked capacitor according to an embodiment.

In the stacked capacitor 10, the first external electrode 2a and the second external electrode 2b constitute a pair of external electrodes, the first external electrode 2a is disposed on the first end surface 1c of the laminate 1, and the second external electrode 2b is disposed on the second end surface 1d of the laminate 1. As shown in FIG. 1, the first external electrode 2a is disposed so as to cover the overall first end surface 1c, and the second external electrode 2b is disposed so as to cover the overall second end surface 1d.

In addition, in the stacked capacitor 10, the third external electrode 2c and the fourth external electrode 2d constitute a pair of the external electrodes 2, the third external electrode 2c is disposed on the first side surface 1e of the laminate 1, and the fourth external electrode 2d is disposed on the second side surface 1f of the laminate 1. As shown in FIG. 1, the third external electrode 2c is disposed to extend from the first side surface 1e to the first surface 1a and the second surface 1b, and the fourth external electrode 2d is disposed to extend from the second side surface 1f to the first surface 1a and the second surface 1b.

Figure 8A:
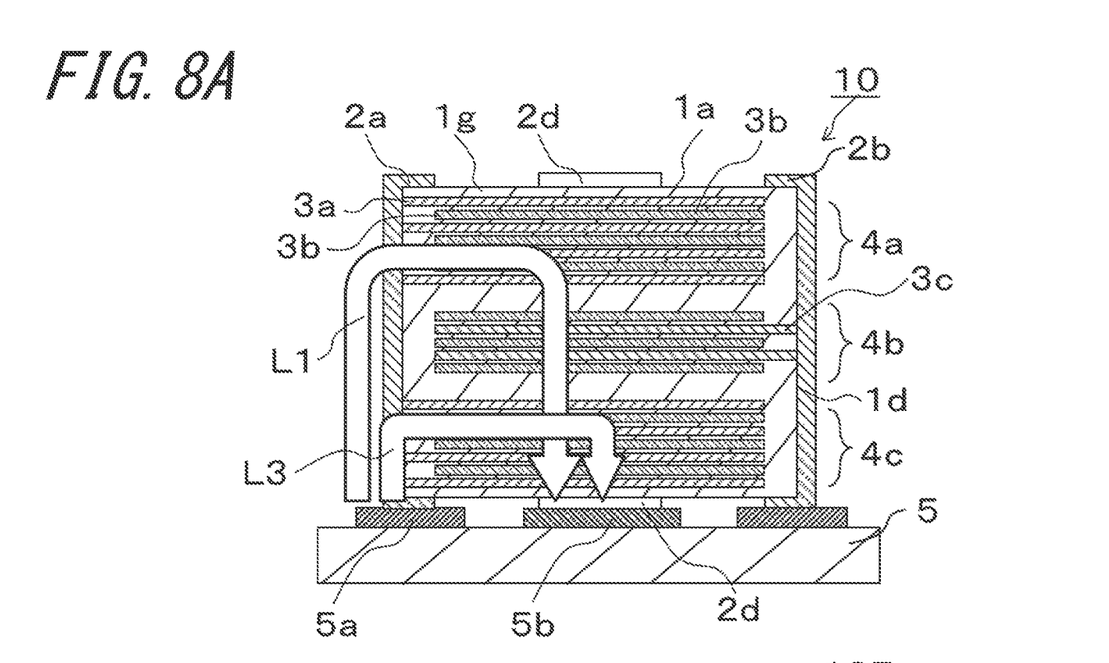
FIGS. 8A and 8B are illustrative views illustrating an inductor component of the stacked capacitor.
Figure 8B:
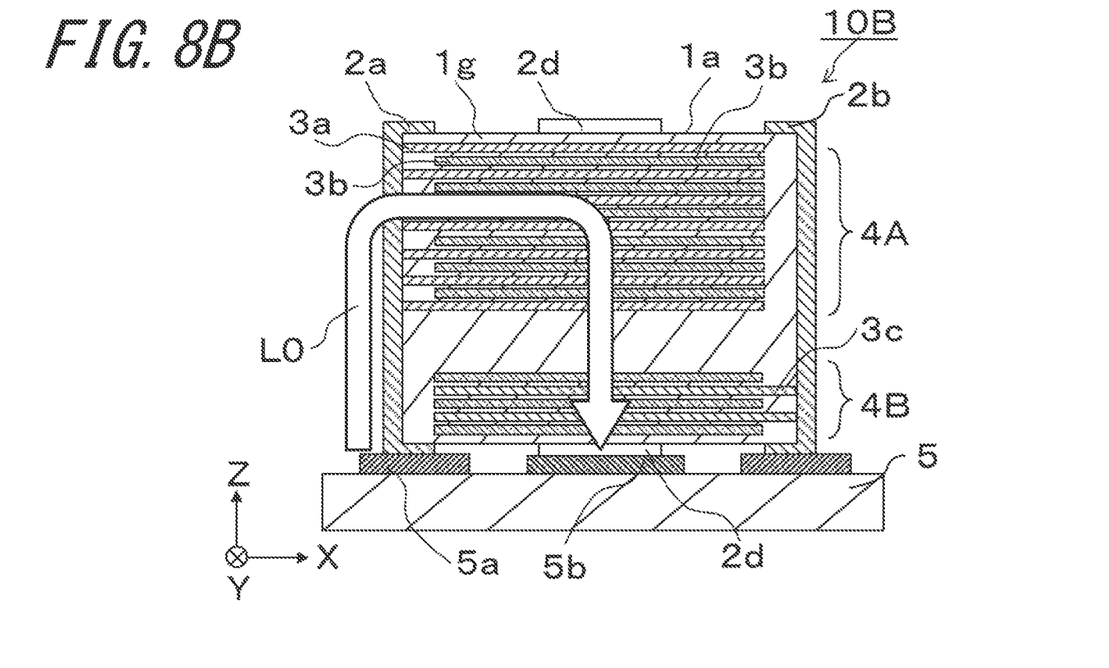

As shown in FIGS. 8A and 8B, the first external electrode 2a and the second external electrode 2b are connected to, for example, a signal line or a current line on a mounting board 5 on which the stacked capacitor 10 is mounted. In addition, the third external electrode 2c and the fourth external electrode 2d are connected to, for example, a ground line on the mounting board 5 on which the stacked capacitor 10 is mounted.

The external electrode 2 includes a base electrode and a plating layer (not shown). The base electrode is provided on a surface of the laminate 1 and electrically connected to the first internal electrode 3a exposed to the first end surface 1c and the third internal electrode 3c exposed to the second end surface 1d. In addition, the base electrode is electrically connected to the second internal electrode 3b exposed to the first side surface 1e and the second side surface 1f. The plating layer is disposed on a surface of the base electrode so as to cover the base electrode. The plating layer is disposed so as to cover the base electrode for the purpose of protecting the base electrode.

A conductive material of the base electrode is a metal material such as nickel (Ni), copper (Cu), silver (Ag), palladium (Pd), or gold (Au). Alternatively, the conductive material of the base electrode is an alloy material such as Ag—Pd alloy including one or more kinds of those metal materials.

In addition, the plating layer is provided on the surface of the base electrode so as to cover the base electrode formed on the surface of the laminate 1. The plating layer is, for example, a nickel (Ni) plating layer, a copper (Cu) plating layer, a gold (Au) plating layer, a tin (Sn) plating layer, or the like. The plating layer is formed by, for example, an electroplating method.

As the plating layer, on the surface of the base electrode, a single plating layer may be provided or a plurality of plating layers may be provided. In the case of the plurality of plating layers, the plating layer is formed by, for example, a laminate of two layers including a first plating layer and a second plating layer formed on a surface of the first plating layer. For example, the plating layer can be formed of the laminate of two layers of an Ni plating layer and an Sn plating layer in which the Ni plating layer is provided on the surface of the base electrode and the Sn plating layer is provided on a surface of the Ni plating layer.

Figure 2A:
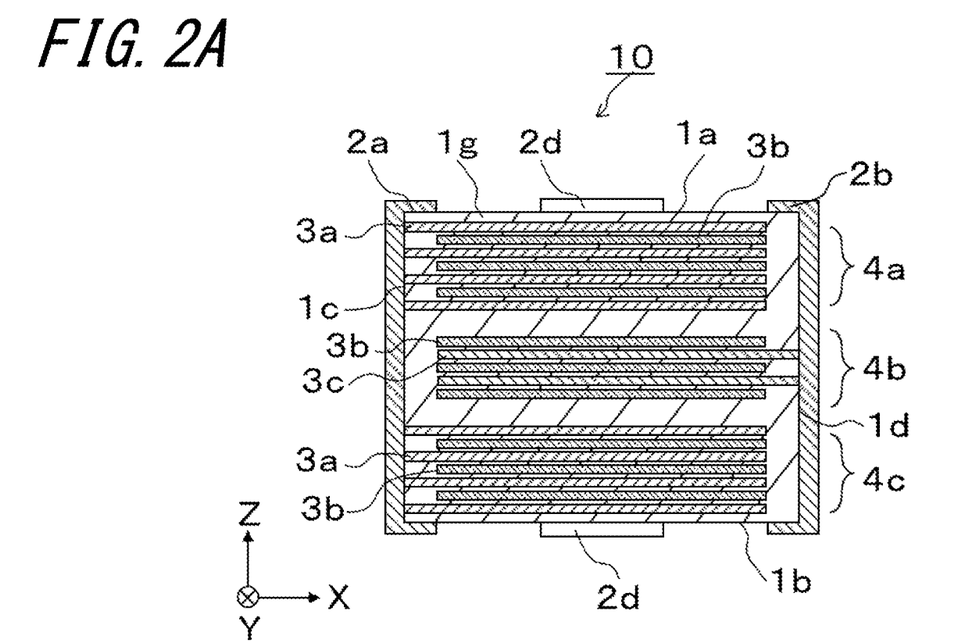
FIG. 2A is a cross-sectional view of the stacked capacitor shown in FIG. 1 taken along the line A-A.
Figure 2B:
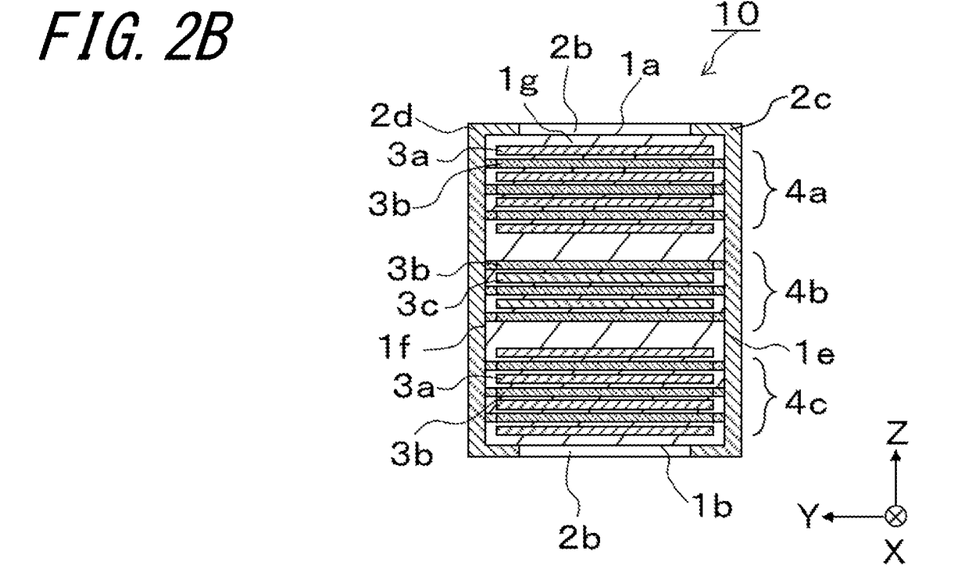
FIG. 2B is a cross-sectional view of the stacked capacitor shown in FIG. 1 taken along the line B-B.
Figure 3:
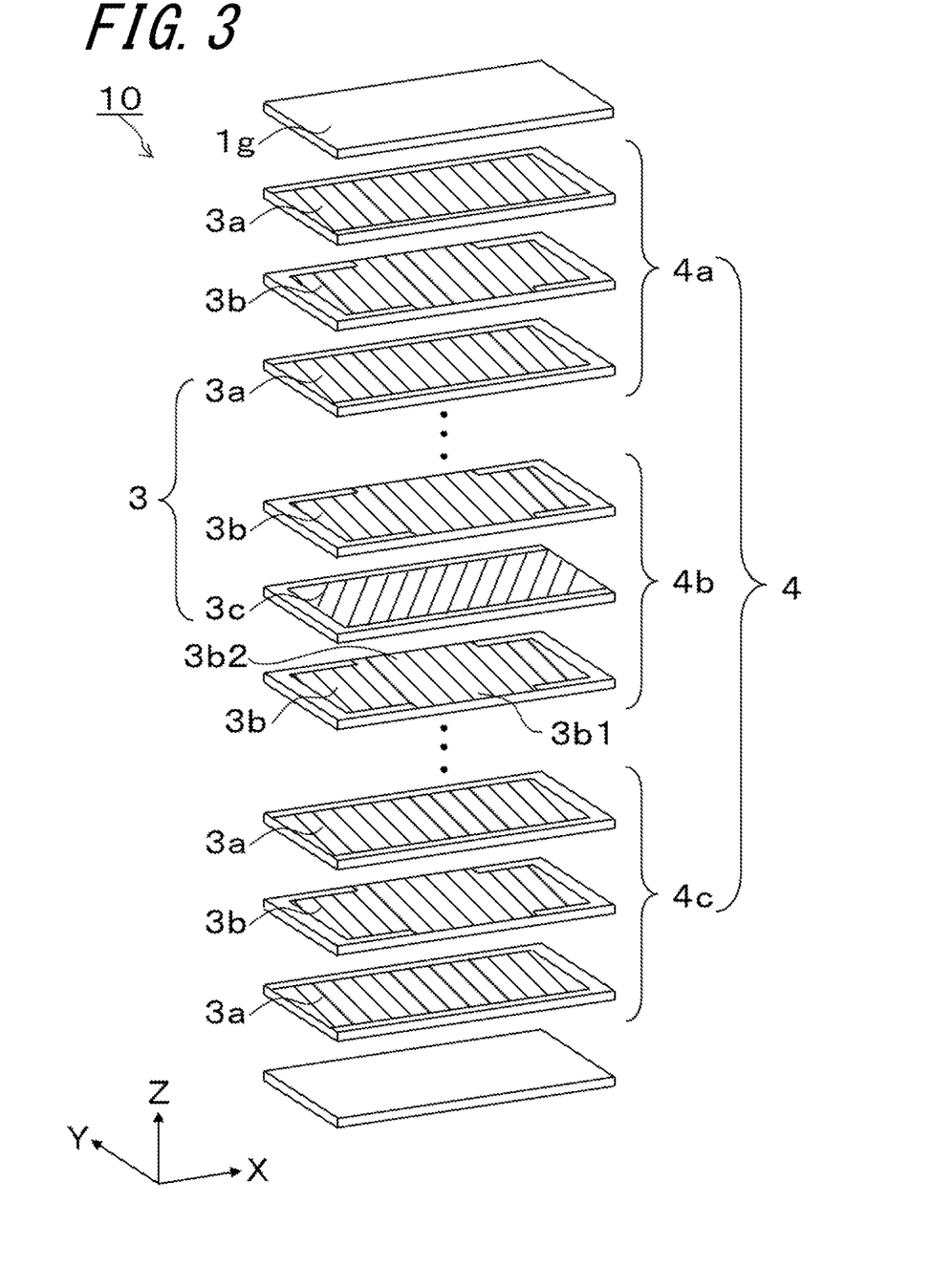
FIG. 3 is a schematic exploded perspective view of a laminate of the stacked capacitor shown in FIG. 1.

In addition, as shown in FIGS. 2A to 3, in the stacked capacitor 10, the first capacitor portion 4a, the second capacitor portion 4b, and the third capacitor portion 4c are arrayed in the laminate 1 in order from the first surface 1a toward the second surface 1b.

Figure 4A:
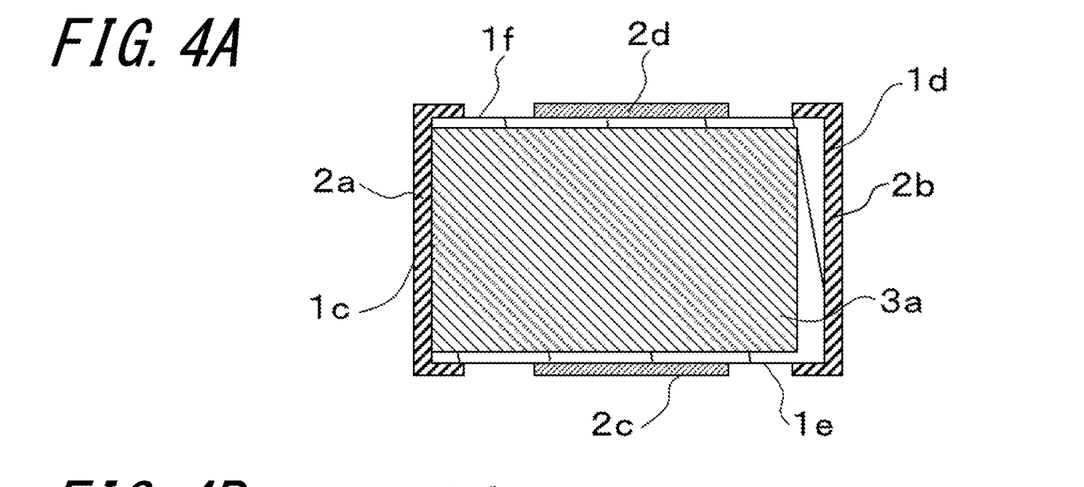
FIG. 4A is a cross-sectional view showing a first internal electrode.
Figure 4B:
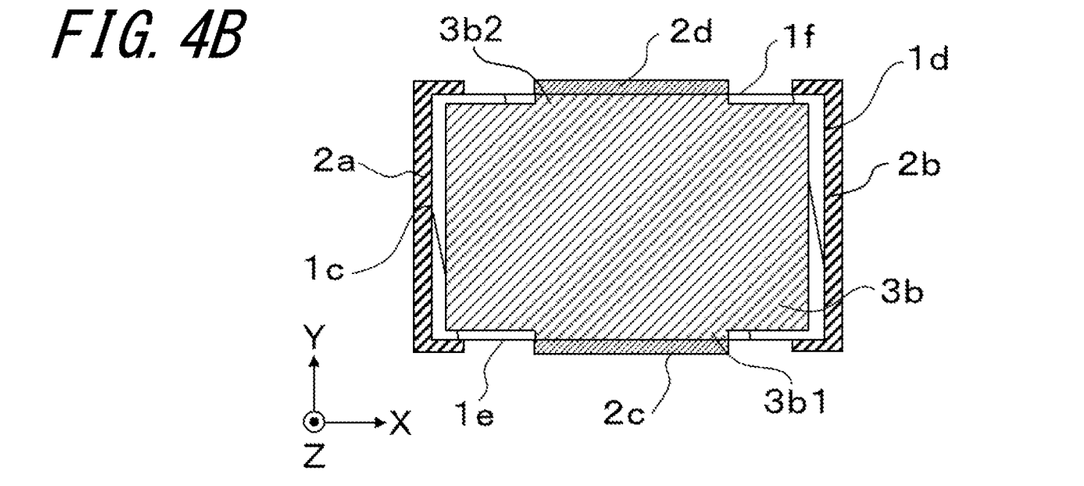
FIG. 4B is a cross-sectional view showing a second internal electrode.

As shown in FIGS. 3 to 4B, the first capacitor portion 4a includes the first internal electrodes 3a, the dielectric layers 1g, and the second internal electrodes 3b. The first internal electrode 3a and the second internal electrode 3b are alternately disposed so as to face each other through the dielectric layer 1g.

As shown in FIG. 4A, one end of the first internal electrode 3a is exposed to the first end surface 1c, and electrically connected to the first external electrode 2a. As shown in FIG. 4B, the second internal electrode 3b includes a lead portion 3b1 on the first side surface 1e side and a lead portion 3b2 on the second side surface if side. The lead portion 3b1 is exposed to the first side surface 1e, and the lead portion 3b2 is exposed to the second side surface 1f. The lead portion 3b1 of the second internal electrode 3b is electrically connected to the third external electrode 2c, and the lead portion 3b2 of the second internal electrode 3b is electrically connected to the fourth external electrode 2d.

Figure 5A:
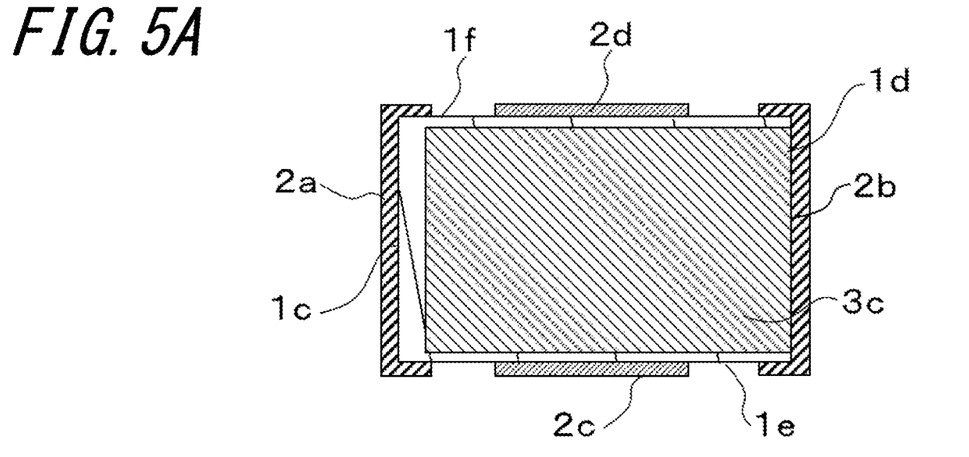
FIG. 5A is a cross-sectional view showing a third internal electrode.
Figure 5B:
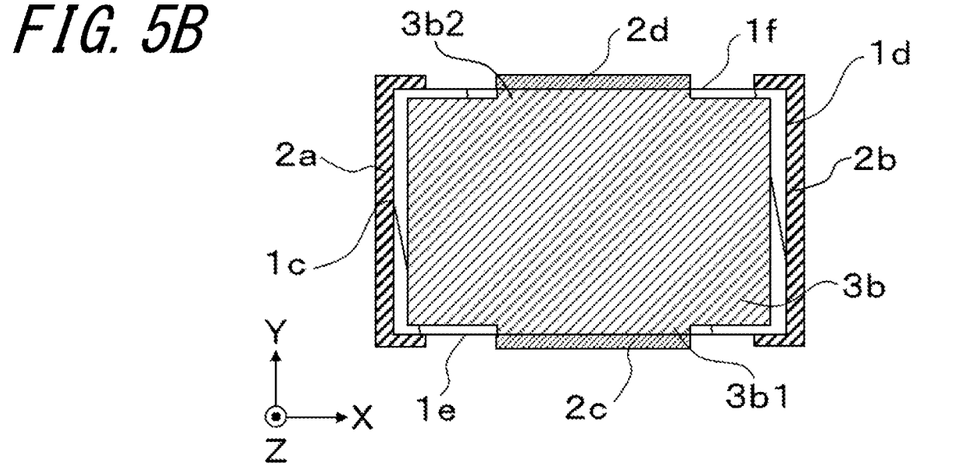
FIG. 5B is a cross-sectional view showing the second internal electrode.

As shown in FIGS. 2A and 2B, the second capacitor portion 4b is disposed between the first capacitor portion 4a and the third capacitor portion 4c. As shown in FIGS. 3, 5A and 5B, the second capacitor portion 4b includes the third internal electrodes 3c, the dielectric layers 1g, and the second internal electrodes 3b. The third internal electrode 3c and the second internal electrode 3b are alternately disposed to face each other through the dielectric layer 1g.

As shown in FIG. 5A, one end of the third internal electrode 3c is exposed to the second end surface 1d, and electrically connected to the second external electrode 2b. As shown in FIG. 5B, the second internal electrode 3b includes a lead portion 3b1 on the first side surface 1e side and a lead portion 3b2 on the second side surface if side. The lead portion 3b1 is exposed to the first side surface 1e, and the lead portion 3b2 is exposed to the second side surface 1f. The lead portion 3b1 of the second internal electrode 3b is electrically connected to the third external electrode 2c, and the lead portion 3b2 of the second internal electrode 3b is electrically connected to the fourth external electrode 2d.

The third capacitor portion 4c includes the first internal electrodes 3a, the dielectric layers 1g, and the second internal electrodes 3b. The first internal electrode 3a and the second internal electrode 3b are alternately disposed so as to face each other through the dielectric layer 1g. The third capacitor portion 4c has the same configuration as that of the first capacitor portion 4a.

In the stacked capacitor 10, the first capacitor portion 4a and the third capacitor portion 4c each have a capacitance larger than that of the second capacitor portion 4b. In order to provide the different capacitances, for example, in the stacked capacitor 10, a total number of laminated layers of the first internal electrodes 3a and the second internal electrodes 3b in the first capacitor portion 4a and the third capacitor portion 4c is set to be larger than a total number of laminated layers of the third internal electrodes 3c and the second internal electrodes 3b in the second capacitor portion 4b.

In the stacked capacitor 10, the second internal electrodes 3b are used in the first capacitor portion 4a, the second capacitor portion 4b, and the third capacitor portion 4c, and common to the first to third capacitor portions 4a to 4c. In the stacked capacitor 10, in the laminating direction of the laminate 1, the first capacitor portion 4a provides a capacitance between the first internal electrode 3a and the second internal electrode 3b, the second capacitor portion 4b provides a capacitance between the second internal electrode 3b and the third internal electrode 3c, and the third capacitor portion 4c provides a capacitance between the first internal electrode 3a and the second internal electrode 3b.

A conductive material of the internal electrode 3 is a metal material such as nickel (Ni), copper (Cu), silver (Ag), palladium (Pd), or gold (Au). Alternatively, the conductive material of the internal electrode 3 is an alloy material such as Ag—Pd alloy including one or more kinds of those metal materials. The internal electrodes 3 may have the same metal material or alloy material. A thickness of the internal electrode 3 is, for example, 0.5 (μm) to 2 (μm).

As described above, in the stacked capacitor 10, as shown in FIG. 3, the first capacitor portion 4a, the second capacitor portion 4b, and the third capacitor portion 4c are provided in the laminate 1. In the first capacitor portion 4a, the first internal electrode 3a and the second internal electrode 3b are arrayed in order from the first surface 1a side toward the second surface 1b side, and the dielectric layer 1g is disposed between the first internal electrode 3a and the second internal electrode 3b.

In addition, in the second capacitor portion 4b, the second internal electrode 3b and the third internal electrode 3c are arrayed in order from the first surface 1a side toward the second surface 1b side, and the dielectric layer 1g is disposed between the second internal electrode 3b and the third internal electrode 3c.

In addition, as with the first capacitor portion 4a, in the third capacitor portion 4c, the first internal electrode 3a and the second internal electrode 3b are arrayed in order from the first surface 1a side toward the second surface 1b side, and the dielectric layer 1g is disposed between the first internal electrode 3a and the second internal electrode 3b.

As shown in FIGS. 2A and 2B, in the stacked capacitor 10, in the first capacitor portion 4a and the third capacitor portion 4c, the first internal electrode 3a and the second internal electrode 3b are alternately disposed in the stated order from the first surface 1a side toward the second surface 1b side. Alternatively, in the stacked capacitor 10, the second internal electrode 3b and the first internal electrode 3a may be alternately disposed in the stated order from the first surface 1a side toward the second surface 1b side.

In addition, as shown in FIGS. 2A and 2B, in the stacked capacitor 10, in the second capacitor portion 4b, the second internal electrode 3b and the third internal electrode 3c are alternately disposed in the stated order from the first surface 1a side toward the second surface 1b side. Alternatively, in the stacked capacitor 10, the third internal electrode 3c and the second internal electrode 3b may be alternately disposed in the stated order from the first surface 1a side toward the second surface 1b side. The number of laminated layers in each of the internal electrodes 3 is appropriately designed according to characteristics of the stacked capacitor 10 or the like.

Figure 6:
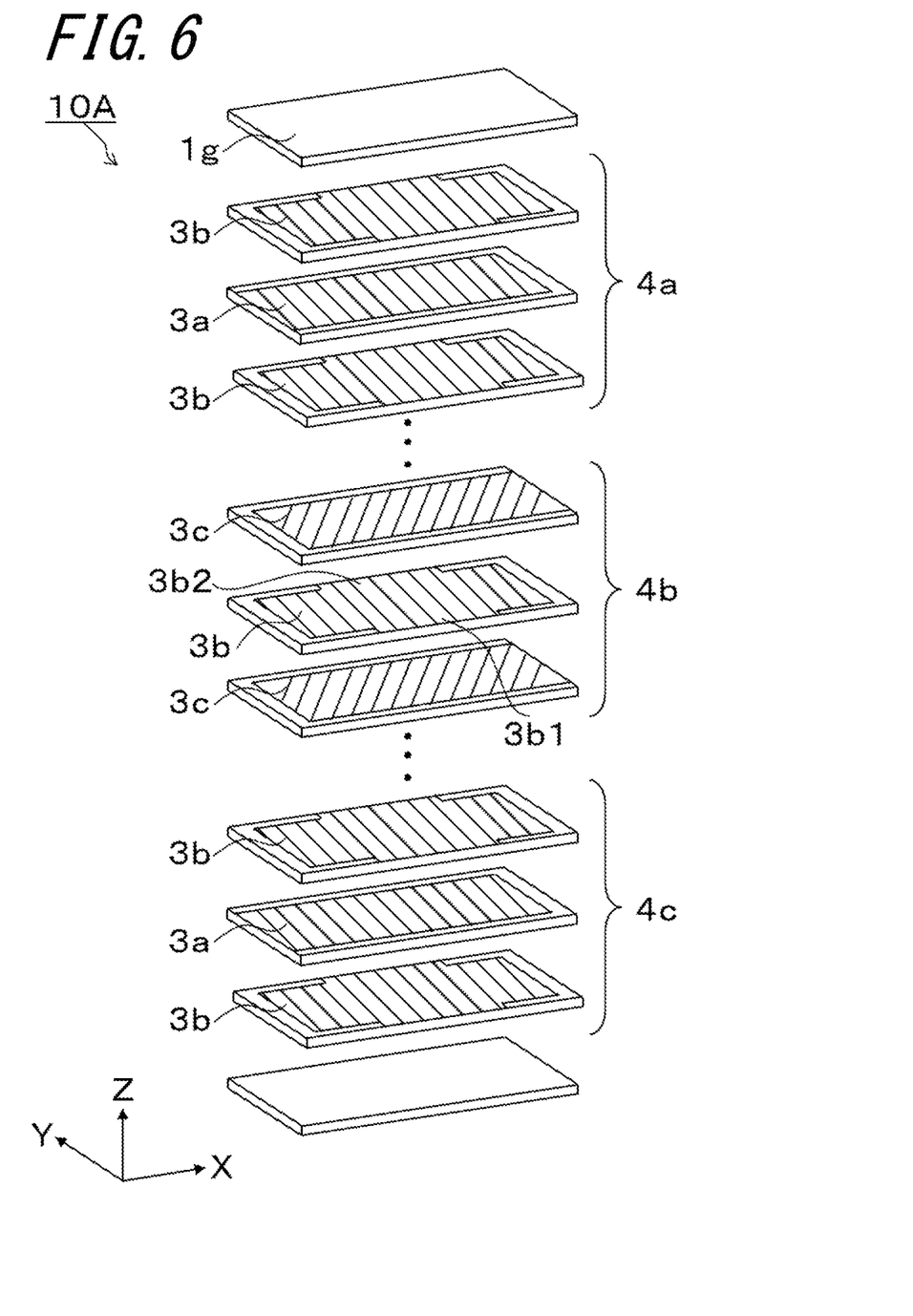
FIG. 6 is a schematic exploded perspective view of a laminate in another example of the stacked capacitor shown in FIG. 1.

As described above, the stacked capacitor 10 is not limited to the placement of the internal electrodes 3 as shown in FIGS. 2A and 2B. For example, as shown in FIG. 6, in a stacked capacitor 10A, the second internal electrode 3b can be disposed on an outermost layer of the first capacitor portion 4a on the first surface 1a side and the second internal electrode 3b can be disposed on an outermost layer of the third capacitor portion 4c on the second surface side in the laminating direction.

In the stacked capacitor 10A, for example, when the second internal electrode 3b is connected to a ground line, the second internal electrode 3b can be disposed on the outermost layer of the first capacitor portion 4a on the first surface 1a side, and the second internal electrode 3b can be disposed on the outermost layer of the third capacitor portion 4c on the second surface 1b side in the laminating direction. In other words, in the stacked capacitor 10A, the second internal electrodes 3b connected to the ground line are disposed on the first surface 1a side and the second surface 1b side, thereby being capable of improving a shielding property by blocking an electric field from the outside.

As described above, in the stacked capacitor 10A, the respective second internal electrodes 3b connected to the ground line are disposed on the outermost layer of the first surface 1a side and the outermost layer of the second surface 1b side, thereby being capable of improving the shielding property and reducing an influence of noise equal to or more than an input tolerance or disturbance noise such as discharge caused by static electricity, for example.

Figure 7:
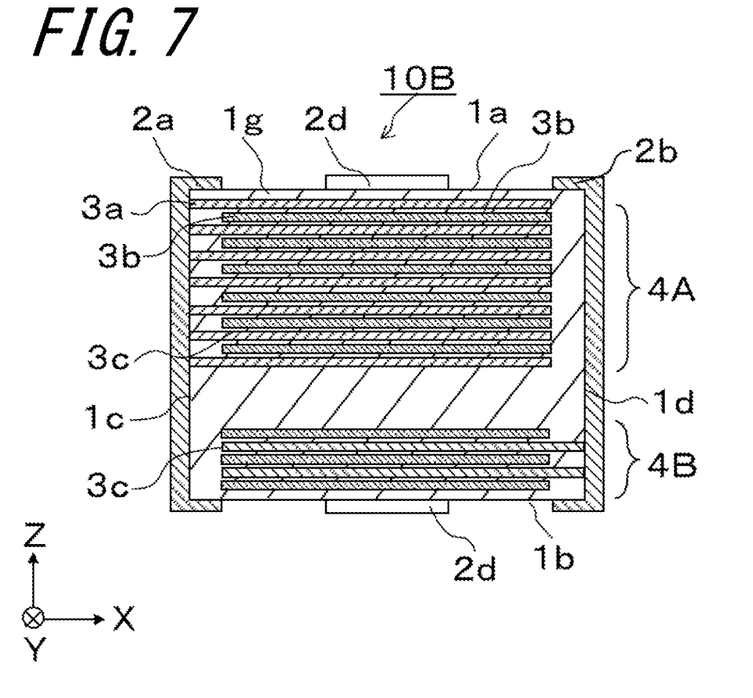
FIG. 7 is a cross-sectional view of a stacked capacitor having two capacitor portions in the laminate.

As shown in FIG. 7, a stacked capacitor 10B includes two capacitor portions in the laminate 1. In the stacked capacitor 10, a capacitor portion 4A in the stacked capacitor 10B shown in FIG. 7 is divided into two capacitor portions of the first capacitor portion 4a and the third capacitor portion 4c, and the respective capacitor portions are disposed on both ends in the laminate 1 in the laminating direction.

When it is assumed that a capacitance of the capacitor portion 4A of the stacked capacitor 10B is 15 (μF) and a capacitance of a capacitor portion 4B is 1 (μF), in the stacked capacitor 10, for example, a capacitance of the first capacitor portion 4a is 7.5 (μF), a capacitance of the third capacitor portion 4c is 7.5 (μF), and a capacitance of the second capacitor portion 4b is 1 (μF). Further, in the stacked capacitor 10, the second capacitor portion 4b corresponding to the capacitor portion 4B of the stacked capacitor 10B is disposed between the first capacitor portion 4a and the third capacitor portion 4c.

In addition, when it is assumed that a capacitance of the capacitor portion 4A of the stacked capacitor 10B is 15 (μF) and a capacitance of the capacitor portion 4B is 1 (μF), in the stacked capacitor 10, for example, the capacitance of the first capacitor portion 4a may be 5 (μF), the capacitance of the second capacitor portion 4b may be (1 μF), and the capacitance of the third capacitor portion 4c may be 10 (μF). The combination of the capacitances of the first capacitor portion 4a and the third capacitor portion 4c can be appropriately set.

FIGS. 8A and 8B show cross-sectional views when the stacked capacitor 10 and the stacked capacitor 10B are mounted on the mounting board 5. The stacked capacitor 10 includes three capacitor portions in the laminate 1. On the other hand, the stacked capacitor 10B includes two capacitor portions in the laminate 1. L0 denotes an inductor component of the capacitor portion 4A in the stacked capacitor 10B. L1 denotes an inductor component of the first capacitor portion 4a of the stacked capacitor 10. L3 denotes an inductor component of the third capacitor portion 4c of the stacked capacitor 10.

As shown in FIG. 8B, when the stacked capacitor 10B is mounted on the mounting board 5, in the capacitor portion 4A, a distance (a distance from the Z direction) from the surface of the mounting board 5 is large, and therefore a physical length (loop length) of a current path flowing from an input terminal 5a of the mounting board 5 to a GND terminal 5b of the mounting board 5 becomes longer, and an inductor component L0 becomes larger.

On the other hand, as shown in FIG. 8A, when the stacked capacitor 10 is mounted on the mounting board 5, the first capacitor portion 4a and the third capacitor portion 4c are different from each other in a position from the surface of the mounting board 5 in a height direction (Z direction).

As described above, since the first capacitor portion 4a is larger in the distance from the surface of the mounting board 5 in the height direction (Z direction), as shown in FIG. 8A, the physical length (loop length) of the current path flowing from the input terminal 5a of the mounting board 5 to the GND terminal 5b of the mounting board 5 becomes longer, and the inductor component L1 becomes larger. On the other hand, since the third capacitor portion 4c is smaller in the distance (a distance in the Z direction) from the surface of the mounting board 5, as shown in FIG. 8A, the physical length (loop length) of the current path flowing from the input terminal 5a of the mounting board 5 to the GND terminal 5b of the mounting board 5 becomes shorter, and the inductor component L3 becomes smaller. A distance between the capacitor portion 4A and the capacitor portion 4B in the stacked capacitor 10B is substantially the same as a total distance of a distance between the first capacitor portion 4a and the second capacitor portion 4b and a distance between the second capacitor portion 4b and the third capacitor portion 4c in the stacked capacitor 10.

As described above, in the stacked capacitor 10, the first capacitor portion 4a and the third capacitor portion 4c include the inductor component L1 and the inductor component L3 which are different from each other, respectively.

In addition, in the stacked capacitor 10, the physical lengths of the inductor component L1 and the inductor component L3 are different from each other, the inductor components are different from each other, and the inductor component L1 and the inductor component L3 are connected in parallel to each other. In other words, in the stacked capacitor 10, the inductor component L1 of the first capacitor portion 4a and the inductor component L3 of the third capacitor portion 4c are different in physical length from each other, and the first external electrode 2a is connected in parallel to the third external electrode 2c and the fourth external electrode 2d. An inductor component obtained by combining the first capacitor portion 4a and the third capacitor portion 4c together includes two inductor components of the inductor component L1 and the inductor component L3 which are connected in parallel to each other.

As described above, the stacked capacitor 10 has the inductor component L1 and the inductor component L3 different in physical length connected in parallel to each other, which are smaller than the inductor component L0 of the stacked capacitor 10B, and can realize a lower impedance in a high frequency range. Therefore, in the stacked capacitor 10, since the equivalent series inductance (ESL) is reduced, and a resonance frequency can be shifted to a high frequency domain side, noise in the high frequency domain can be reduced.

Figure 9:
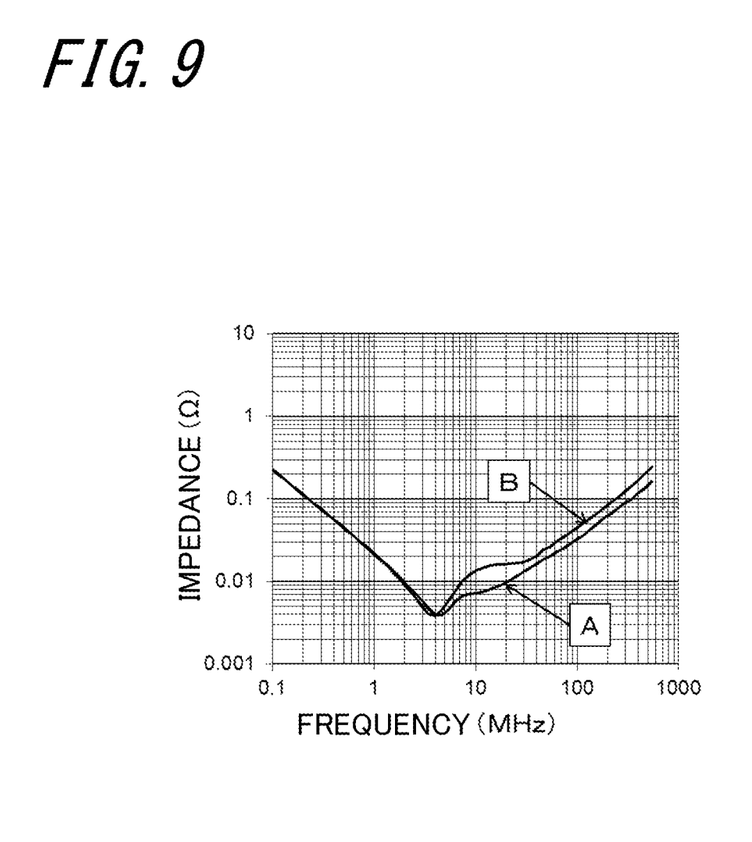
FIG. 9 is a graph showing an impedance characteristic of a frequency band in the stacked capacitor according to the embodiment.

FIG. 9 is a graph showing impedance characteristics of frequency bands of the stacked capacitor 10 and the stacked capacitor 10B, in which symbol A indicates the impedance characteristic of the stacked capacitor 10, and symbol B indicates the impedance characteristic of the stacked capacitor 10B. In the stacked capacitor 10, the capacitances of the first capacitor portion 4a and the third capacitor portion 4c are 7.5 (μF), and the capacitance of the second capacitor portion 4b is 1 (μF). In the stacked capacitor 10B, the capacitance of the capacitor portion 4A is 15 (μF), and the capacitance of the capacitor portion 4B is 1 (μF). The other configuration of the stacked capacitor 10B is the same as that of the stacked capacitor 10. In the stacked capacitor 10 and the stacked capacitor 10B, the length in the longitudinal direction (X direction) is 1.15 (mm), the length in the lateral direction (Y direction) is 0.65 (mm), and the length in the height direction (Z direction) is 0.8 (mm).

As shown in FIG. 9, in the stacked capacitor 10, the equivalent series inductance (ESL) becomes smaller, the resonance frequency is shifted to the high frequency range side, and the impedance in the high frequency range is smaller than that of the stacked capacitor 10B.

In addition, in the stacked capacitor 10, the capacitances of the first capacitor portion 4a and the third capacitor portion 4c are the same as each other, and a directivity of a vertical direction of the capacitor portions when the stacked capacitor 10 is mounted on the mounting substrate 5 is eliminated. Therefore, the stacked capacitor 10 can be mounted on the mounting board 5 without distinction between upper and lower. In order to set the capacitances of the first capacitor portion 4a and the third capacitor portion 4c to be the same as each other, in the stacked capacitor 10, for example, the respective total numbers of laminated layers of the first internal electrodes 3a and the second internal electrodes 3b in the first capacitor portion 4a and the third capacitor portion 4c are set to be same as each other. In the stacked capacitor 10, when a value of the capacitance of the first capacitor portion 4a is set to 100, a value of the capacitance of the third capacitor portion 4c falling within a range of 97 to 103 means that the capacitance is the same.

In addition, in the stacked capacitor, in a manufacturing process, a pressure, a contraction stress, or the like from the upper and lower surfaces occurs in an area (for example, an area of the stacked capacitor 10B on the second external electrode 2b side) in which the internal electrodes are not disposed, and deformation of the internal electrodes are likely to occur. However, in the stacked capacitor 10, the first capacitor portion 4a and the third capacitor portion 4c are disposed symmetrically to each other with respect to the second capacitor 4b in the laminating direction of the laminate 1. The first capacitor portion 4a and the third capacitor portion 4c are vertically symmetrical with respect to the second capacitor portion 4b, and in the stacked capacitor 10, in an area on the second external electrode 2b side, the first internal electrodes 3a and the second internal electrodes 3b in the first capacitor portion 4a and the third capacitor portion 4c are less likely to be deformed. In addition, in the stacked capacitor 10, the second internal electrodes 3b and the third internal electrodes 3c in the second capacitor portion 4b are less likely to be deformed.

Therefore, in the stacked capacitor 10, the first to third internal electrodes 3a to 3c in the laminate 1 are less likely to be deformed, and the reliability is improved. In addition, in the stacked capacitor, the directivity of the capacitor portions in the vertical direction when the stacked capacitor is mounted on the mounting board 5 is eliminated.

Now, an example of a method of manufacturing the stacked capacitor 10 shown in FIG. 1 will be described.

A plurality of first to third ceramic green sheets are prepared. The first ceramic green sheets form the first internal electrodes 3a. The second ceramic green sheets form the second internal electrodes 3b. The third ceramic green sheets form the third internal electrodes 3c.

In the plurality of first ceramic green sheets, a conductive paste layer of the first internal electrode 3a is formed on a ceramic green sheet with the use of a conductive paste for the first internal electrode 3a. In the first ceramic green sheet, in order to obtain a large number of stacked capacitors 10, the plurality of first internal electrodes 3a are formed in a single ceramic green sheet.

In the plurality of second ceramic green sheets, a conductive paste layer of the second internal electrode 3b is formed on the ceramic green sheet with the use of a conductive paste for the second internal electrode 3b. In the second ceramic green sheet, in order to obtain the large number of stacked capacitors 10, the plurality of second internal electrodes 3b are formed in a single ceramic green sheet.

In the plurality of third ceramic green sheets, a conductive paste layer of the third internal electrode 3c is formed on the ceramic green sheet with the use of a conductive paste for the third internal electrode 3c. In the third ceramic green sheet, in order to obtain the large number of stacked capacitors 10, the plurality of third internal electrodes 3c are formed in a single ceramic green sheet.

In the conductive paste layer of each internal electrode 3 described above, each conductive paste is formed on the ceramic green sheet in a predetermined pattern shape, for example, through a screen printing method.

The first to third ceramic green sheets form the dielectric layers 1g, the conductive paste layer of each first internal electrode 3a forms the first internal electrode 3a, the conductive paste layer of each second internal electrode 3b forms the second internal electrode 3b, and the conductive paste layer of each third internal electrode 3c forms the third internal electrode 3c.

A material of the ceramic green sheets mainly contains dielectric ceramics such as $BaTiO_3$, $CaTiO_3$, $SrTiO_3$, or $CaZrO_3$. As sub-components, the material of the ceramic green sheets may be added with, for example, an Mn compound, a Fe compound, a Cr compound, a Co compound, an Ni compound, or the like.

The first to third ceramic green sheets are obtained in such a manner that an appropriate organic solvent is added to raw material powder of dielectric ceramics and organic binder and mixed together to prepare a muddy ceramic slurry and molded through a doctor blade method or the like.

The conductive paste for the internal electrodes 3 are prepared by adding an additive (dielectric material), a binder, a solvent, a dispersant, or the like to powders of the conductor material (metal material) of the internal electrode 3 described above and kneading the mixture. The conductor material of the internal electrode 3 is a metal material such as nickel (Ni), copper (Cu), silver (Ag), palladium (Pd), or gold (Au). Alternatively, the conductive material of the internal electrode 3 is an alloy material such as Ag—Pd alloy including one or more kinds of those metal materials. The internal electrodes 3 may have the same metal material or alloy material.

For example, the first to third ceramic green sheets are laminated on each other sequentially as shown in FIG. 3. The ceramic green sheets on which no internal electrode is formed are laminated on the outermost layers in the laminating direction (Z direction) to provide the laminate as shown in FIG. 3.

In the laminate laminated as described above, pressing is carried out for integration to provide a large green laminate including a large number of green laminates 1. The large green laminates are cut, thereby being capable of obtaining the green laminate 1 serving as the laminate 1 of the stacked capacitor 10 shown in FIG. 1. The large green laminate can be cut with the use of, for example, a dicing blade or the like.

The laminate 1 is obtained by firing the green laminate, for example, at 800 (° C.) to 1300 (° C.). With firing, the plurality of first to third ceramic green sheets form the dielectric layers 1g, the conductive paste layers of the first internal electrodes 3a form the first internal electrodes 3a, the conductive paste layers of the second internal electrodes 3b form the second internal electrodes 3b, and the conductive paste layers of the third internal electrodes 3c form the third internal electrodes 3c. In addition, corners or sides of the laminate 1 are less likely to be cracked by rounding the corners or sides with the use of a polishing means such as barrel polishing.

Next, the first external electrode 2a and the second external electrode 2b are formed by, for example, coating and baking the conductive pastes for the first external electrodes 2a and the second external electrodes 2b on the first end surface 1c and the second end surface 1d of the laminate 1. The conductive pastes for the first external electrodes 2a and the second external electrodes 2b are prepared by adding a binder, a solvent, a dispersant, or the like on powder of a metal material configuring the first external electrode 2a and the second external electrode 2b described above and kneading the mixture.

In addition, in the third external electrodes 2c and the fourth external electrodes 2d, for example, the conductive pastes for the third external electrodes 2c and the fourth external electrodes 2d are formed on the first side surface 1e and the second side surface 1f, for example, through a roller transfer method. More specifically, the conductive pastes for the third external electrodes 2c and the fourth external electrodes 2d are transferred onto the first side surface 1e and the second side surface 1f through the roller transfer method, as a result of which the conductive pastes are provided on the first side surface 1e (second side surface 1f) and extend to the first surface 1a and the second surface 1b.

For the purpose of protecting the external electrodes 2 or improving the mountability of the stacked capacitor 10, a metal layer is formed on the surface of the external electrodes 2. The metal layer is formed by, for example, a plating method. The external electrode 2 is formed with, for example, an Ni plating layer and an Sn plating layer on the Ni plating layer.

The method of forming the external electrodes 2 may be performed by a thin film forming method such as a deposition method, a plating method, or a sputtering method other than the method of baking the conductive paste.

The present disclosure is not limited to the stacked capacitor according to the embodiments described above, and various modifications and variations are possible without departing from the scope of the present disclosure.

REFERENCE SIGNS LIST

1: Laminate
1a: First surface
1b: Second surface
1c: First end surface
1d: Second end surface
1e: First side surface
1f: Second side surface
1g: Dielectric layer
2: External electrode
2a: First external electrode
2b: Second external electrode
2c: Third external electrode
2d: Fourth external electrode
3: Internal electrode
3a: First internal electrode
3b: Second internal electrode
3c: Third internal electrode
4: Capacitor portion
4a: First capacitor portion
4b: Second capacitor portion
4c: Third capacitor portion
5: Mounting board
5a: Input terminal
5b: GND terminal
10, 10A, 10B: Stacked capacitor

The invention claimed is:

1. A stacked capacitor, comprising:
a laminate having a rectangular parallelepiped shape, comprising a plurality of dielectric layers laminated on each other, the laminate comprising a first surface and a second surface which are opposed to each other, a first side surface and a second side surface which are opposed to each other, and a first end surface and a second end surface which are opposed to each other;
a first external electrode disposed on the first end surface, a second external electrode disposed on the second end surface, a third external electrode disposed on the first side surface, and a fourth external electrode disposed on the second side surface; and
a first capacitor portion, a second capacitor portion, and a third capacitor portion which are arrayed in the laminate from the first surface toward the second surface along a laminating direction,
the first capacitor portion and the third capacitor portion being configured so that first internal electrodes each of which is exposed to the first end surface and electrically connected to the first external electrode and second internal electrodes each of which is exposed to the first side surface and the second side surface and electrically connected to the third external electrode and the fourth external electrode are alternately disposed to face each other through dielectric layers of the plurality of dielectric layers,
the second capacitor portion being disposed between the first capacitor portion and the third capacitor portion, the second capacitor portion being configured so that third internal electrodes each of which is exposed to the second end surface and electrically connected to the second external electrode and the second internal electrodes each of which is exposed to the first side surface and the second side surface and electrically connected to the third external electrode and the fourth external electrode are alternately disposed to face each other through dielectric layers of the plurality of dielectric layers,
the first capacitor portion and the third capacitor portion each having a capacitance larger than that of the second capacitance portion,
inductor components of the first capacitor portion and the third capacitor portion being different in physical length from each other and being connected in parallel between the first external electrode and the third external electrode and between the first external electrode and the fourth external electrode.

2. The stacked capacitor according to claim 1, wherein
a total number of laminated layers of the first internal electrodes and the second internal electrodes in the first capacitor portion and the third capacitor portion is larger than a total number of laminated layers of the second internal electrodes and the third internal electrodes in the second capacitor portion.

3. The stacked capacitor according to claim 1, wherein the first capacitor portion and the third capacitor portion have a same capacitance.

4. The stacked capacitor according to claim 1, wherein a total number of laminated layers of the first internal electrodes and the second internal electrodes in the first capacitor portion is equal to a total number of laminated layers of the first internal electrodes and the second internal electrodes in the third capacitor portion.

5. The stacked capacitor according to claim 1, wherein the first capacitor portion and the third capacitor portion are disposed symmetrically to each other with respect to the second capacitor portion in a laminating direction of the laminate.

6. The stacked capacitor according to claim 2, wherein the first capacitor portion and the third capacitor portion have a same capacitance.

7. The stacked capacitor according to claim 2, wherein a total number of laminated layers of the first internal electrodes and the second internal electrodes in the first capacitor portion is equal to a total number of laminated layers of the first internal electrodes and the second internal electrodes in the third capacitor portion.

8. The stacked capacitor according to claim 3, wherein a total number of laminated layers of the first internal electrodes and the second internal electrodes in the first capacitor portion is equal to a total number of laminated layers of the first internal electrodes and the second internal electrodes in the third capacitor portion.

9. The stacked capacitor according to claim 2, wherein the first capacitor portion and the third capacitor portion are disposed symmetrically to each other with respect to the second capacitor portion in a laminating direction of the laminate.

10. The stacked capacitor according to claim 3, wherein the first capacitor portion and the third capacitor portion are disposed symmetrically to each other with respect to the second capacitor portion in a laminating direction of the laminate.

11. The stacked capacitor according to claim 4, wherein the first capacitor portion and the third capacitor portion are disposed symmetrically to each other with respect to the second capacitor portion in a laminating direction of the laminate.

* * * * *